June 2, 1959
R. WILLARDSON ET AL
2,889,492
SWITCHING CIRCUITS AND METHODS
Filed June 30, 1955
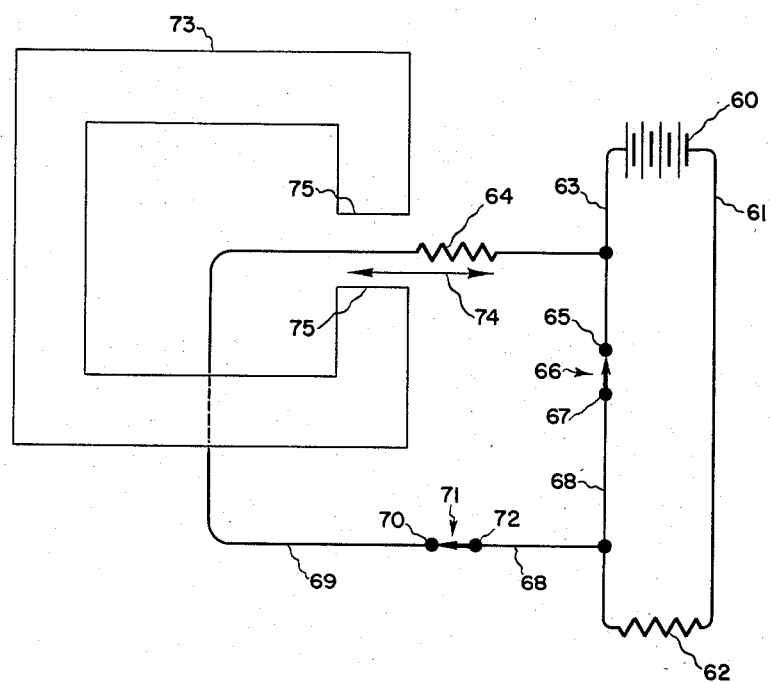
*INVENTORS*
ROBERT K. WILLARDSON
ALBERT C. BEER
BY *Gray, Mase*
*& Dunson*
ATTORNEYS

United States Patent Office 2,889,492
Patented June 2, 1959

2,889,492
SWITCHING CIRCUITS AND METHODS

Robert Willardson and Albert C. Beer, Columbus, Ohio, assignors, by mesne assignments, to The Battelle Development Corporation, Franklin, Ohio, a corporation of Delaware Application June 30, 1955, Serial No. 519,070

2 Claims. (Cl. 317—11)

This invention relates to switching circuits and methods for opening and closing electrical connections with a minimum of arcing.

In the drawing the figure is a schematic diagram of an arc-reducing switch circuit according to the present invention.

The figure illustrates a switching circuit for minimizing the amount of arcing encountered when the circuit is opened. One terminal of a D.-C. voltage source 60 is connected by a wire 61 to one end of a load 62. The other terminal of the voltage source 60 is connected by a wire 63 to one end of a magnetoresistance element 64 and to a contact 65 of a single-pole, single-throw switch 66. The other contact 67 of the switch 66 is connected by a wire 68 to the other end of the load 62. The other end of the magnetoresistance element 64 is connected by a wire 69 to one contact 70 of a second single-pole, single-throw switch 71. The other contact 72 is connected to the wire 68. A permanent magnet 73 and the magnetoresistance element 64 are movable relative to each other as is indicated at 74, between the position shown in Fig. 21 in which the magnetic field between the poles 75—75 of the magnet 73 is removed from the magnetoresistance element 64 and a position in which the magnetic field between the poles 75—75 encompasses all or substantially all of the magnetoresistance element 64.

With the switches 66, 71 closed, and with the magnetoresistance element 64 in the position shown in the figure outside the magnetic field or the permanent magnet 73, the circuit between the voltage source 60 and the load 62 is opened by first opening the switch 66, then inserting the magnetoresistance element 64 into the magnetic field between the poles 75—75 of the magnet 73, and then opening the other switch 71. Where the magnetoresistance element 64 has a resistance change of 81, from one-ninth the resistance of the load 62 to nine times the resistance of the load 62, the reduction in the current when the switch 66 is opened is only one-tenth as great as the reduction in current that would take place if the circuit shunting the switch 66 were not present, and the reduction in the current produced when the switch 71 is opened is only one-tenth of the current reduction that would take place in a single-stage opening of the circuit between the voltage source 60 and the switch 62. If further reduction is desired, the circuit can be cascaded in obvious ways. For multiple switching, duplicates of the circuit can be added with corresponding switches and movable elements ganged. To close the circuit, the reverse sequence of switching and of moving the magnetoresistance element 64 can be used to provide a gradual increase in the voltage applied to the load 62. Of course the switch 66 may be closed first, if desired, but the switch 71 should be closed and the magnetoresistance element 64 should be removed from the field of the magnet 73 before the switch 66 is next opened.

While the form of the invention herein disclosed constitutes a preferred embodiment, it is not intended herein to describe all of the possible equivalent forms or ramifications of the invention. It will be understood that the words used are words of description rather than of limitation, and that various changes may be made without departing from the spirit or scope of the invention herein disclosed.

What is claimed is:

1. A method of opening a closed switch with a minimum of arcing that comprises placing in series across the terminals of said switch a second closed switch and a magnetoresistance element; said magnetoresistance element being located away from any magnetic field, and thereby having its minimum resistance, while the first said switch remains closed; opening said first switch, placing said magnetoresistance element in a magnetic field of sufficient strength to provide a substantial increase in the resistance of said magnetoresistance element, and opening said second switch.

2. A method of opening a closed switch with a minimum of arcing that comprises placing in series across the terminals of said switch a second closed switch and a magnetoresistance element; said magnetoresistance element being free from any substantial magnetic field, and thereby having its minimum resistance, while the first said switch remains closed; opening said first switch, subjecting said magnetoresistance element to a magnetic field of sufficient strength to provide a substantial increase in the resistance of said magnetoresistance element, and opening said second switch.

References Cited in the file of this patent

UNITED STATES PATENTS

| | | |
|---|---|---|
| 2,339,526 | Thompson | Jan. 18, 1944 |
| 2,435,062 | Walsh | Jan. 27, 1948 |
| 2,455,935 | Keller | Dec. 14, 1948 |
| 2,463,753 | Dekker | Mar. 8, 1949 |
| 2,474,966 | Addink | July 5, 1949 |
| 2,522,521 | Kock | Sept. 19, 1950 |
| 2,547,614 | Bedford | Apr. 3, 1951 |
| 2,603,768 | Trindle | July 15, 1952 |
| 2,616,074 | McCreary | Oct. 28, 1952 |
| 2,619,627 | Slepian | Nov 25, 1952 |
| 2,620,466 | Hagen | Dec. 2, 1952 |
| 2,632,062 | Montgomery | Mar. 17, 1953 |
| 2,637,769 | Walker | May 5, 1953 |
| 2,659,043 | Taylor | Nov. 10, 1953 |
| 2,705,766 | Chen | Apr. 5, 1955 |